United States Patent [19]

Golin

[11] Patent Number: 5,440,350
[45] Date of Patent: Aug. 8, 1995

[54] METHOD AND APPARATUS FOR ENCODING SELECTED BLOCKS OF A RESIDUAL IMAGE SIGNAL

[75] Inventor: Stuart J. Golin, East Windsor, N.J.

[73] Assignee: Intel Corporation, Santa Clara, Calif.

[21] Appl. No.: 69,138

[22] Filed: May 28, 1993

[51] Int. Cl.$^6$ ............................................... H04N 7/28
[52] U.S. Cl. ..................................... 348/699; 348/416
[58] Field of Search ............... 348/420, 421, 400, 401, 348/402, 416, 415, 409, 390, 384, 699, 700, 701

[56] References Cited

U.S. PATENT DOCUMENTS

| | | | |
|---|---|---|---|
| 5,134,478 | 7/1992 | Golin | 358/136 |
| 5,144,688 | 9/1992 | Bovir et al. | 382/56 |
| 5,162,907 | 11/1992 | Keating et al. | 348/416 |
| 5,251,028 | 10/1993 | Iu | 358/133 |
| 5,260,782 | 11/1993 | Hui | 358/133 |
| 5,282,255 | 1/1994 | Bovik et al. | 358/133 |

Primary Examiner—Tommy P. Chin
Assistant Examiner—Bryan S. Tung
Attorney, Agent, or Firm—William H. Murray; N. Stephan Kinsella

[57] ABSTRACT

A method for partially encoding an image. The image is divided into a plurality of blocks and one block is selected for processing. A determination is made whether the selected block is an exterior block. The selected block is encoded only if it is determined to be an exterior block, otherwise, the selected block is ignored for purposes of encoding.

20 Claims, 9 Drawing Sheets

METHOD AND APPARATUS FOR ENCODING SELECTED BLOCKS OF A RESIDUAL IMAGE SIGNAL

FIELD OF THE INVENTION

This invention relates to video signal processing generally and particularly to systems for providing a compressed digital video signal representative of a full color video signal.

BACKGROUND

An important aspect of most methods for compressing sequences of digital video images is motion analysis. In typical motion analysis, a target image in a sequence of images is divided into a plurality of blocks of pixels. A target region comprising at least one pixel block is selected from the target image. The image preceding the target image is analyzed in order to locate a region of the preceding image which closely matches the target region of the target image. Block matching techniques based on mean-square-error or mean-absolute-error are typically used to locate the region of the preceding image which closely matches the target region of the target image. If no motion has occurred, the preceding and target regions will have the same coordinates within the image frame. If motion has occurred, the preceding region will be offset or translated relative to the target region by an amount which is represented by a displacement vector. This process is typically repeated for each target region in the target image, thereby yielding a displacement vector for each target region. These displacement vectors are thereafter applied to a previous reconstructed image to form a predicted image. An error image is formed from the difference (residual errors) between the target image and the predicted image. The displacement vectors and the error image are then encoded for subsequent use by a decoder in decoding the compressed digital video signal. A known motion compensation system is described in U.S. Pat. No. 5,134,478 to Golin, entitled "Method And Apparatus For Compressing And Decompressing A Digital Video Signal Using Predicted And Error Images", the contents of which is hereby incorporated herein by reference.

In image compression, image quality can be improved by encoding images unequally. More particularly, the residual errors that result from the application of motion compensation can be encoded unequally from frame to frame in order to improve image quality. Such an encoding technique is employed in MPEG encoding, which encodes residual errors in every third image more accurately than in intermediate images. This can be done by varying the quantization. An alternative approach, set forth by the present application, applies heuristics to the residual errors in order to determine which ones may be ignored. A heuristic is a rule which produces a visually acceptable image when measured using subjective criteria (such as how the image looks to a viewer), as opposed to an objective measurement such as mean-square-error.

It is an object of the present invention to improve image quality by using heuristics to unequally encode residual errors, such as those that result from motion compensation.

Further objects and advantages of the invention will become apparent from the description of the invention which follows.

SUMMARY OF THE INVENTION

The present invention is directed to a method and apparatus for partially encoding an image such as, for example, a residual error image that is formed as a result of motion compensation. The image is divided into a plurality of blocks and one block is selected for processing. A determination is made whether the selected block is an exterior block. The selected block is encoded only if it is determined to be an exterior block, otherwise, the selected block is ignored for purposes of encoding.

DETAILED DESCRIPTION OF THE PREFERRED EMBODIMENT

Figure 1:
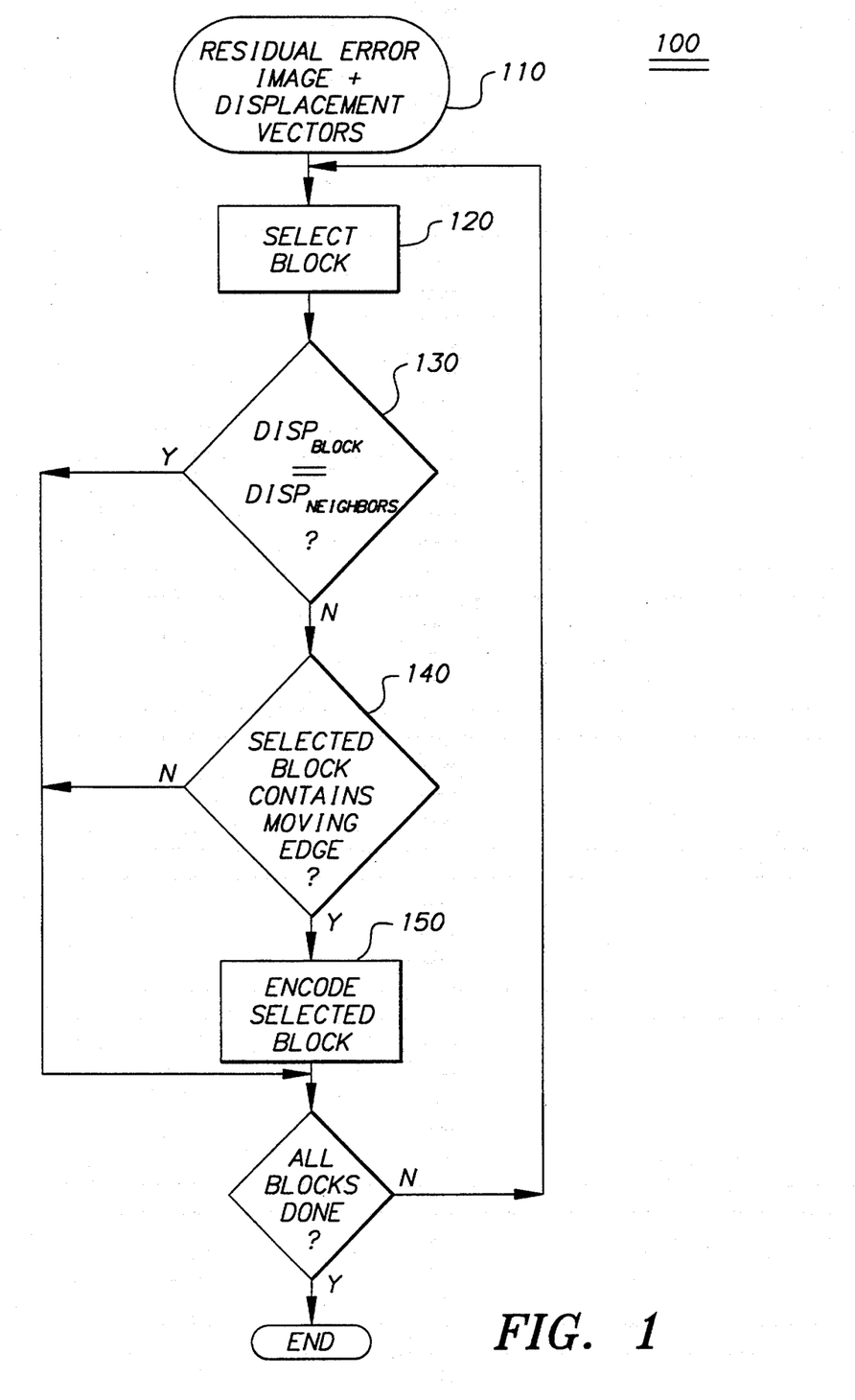
FIG. 1 shows a flow diagram illustrating the operation of a preferred embodiment of the present invention.

Referring now to FIG. 1, there is shown a flow diagram illustrating the operation of partial image encoder 100 according to a preferred embodiment of the present invention. Partial image encoder 100 accepts as its input residual error image 110 and the displacement vectors associated therewith. In the embodiment shown, residual error image 110 is formed as a result of motion compensation and represents the difference between a target image and a predicted image. Partial image encoder 100 may be applied to every residual error image in a sequence of such images; alternatively, residual error images may be selected periodically for partial encoding, to save bits, or for any other reason.

Block selector 120 is provided for selecting a block from residual error image 110 for processing. Displacement comparator 130 is provided for determining whether the selected block is an "interior" block or an "exterior" block. As described more fully below in conjunction with FIG. 3, displacement comparator 130 compares the displacement vector associated with the selected block with each of the displacement vectors associated with the neighboring blocks of the selected block. For purposes of the embodiment shown in FIG. 1, if the selected block has the same displacement vector as that of each of its neighbors, the selected block is defined to be an interior block; otherwise, the selected block is defined as an exterior block.

The most objectionable errors in residual images often occur in exterior blocks. Such errors, if left uncoded, lead to blocky images. However, visibly acceptable results can be achieved if the residual errors associated with exterior blocks are encoded, even if the residual errors in all other blocks are ignored. Thus, if displacement comparator 130 determines that the selected block is not an exterior block (i.e., the selected block does not have a displacement vector that varies from at least one of its neighbors), the residual errors in the selected block are not encoded.

When motion is relatively simple, most blocks have the same (or similar) displacements as their neighbors. Since most of these blocks will not qualify as exterior blocks, application of the present invention means that the residual errors in most blocks will not have to be encoded, thereby resulting in a large savings of bits. The impact of periodically limiting the encoding of residual errors to exterior blocks is to reduce the update rate of the errors associated with part of the imagery. This is not visually disturbing, provided that the motion associated with small objects is not ignored.

Referring again to FIG. 1, if displacement comparator 130 determines that the selected block is an exterior block, then moving edge finder 140 processes the selected block to determine whether it contains at least one moving edge. Encoder 150 is provided for encoding the residual errors of only those exterior blocks that are determined to contain a moving edge. Thus, although residual errors in interior blocks are always ignored, in the preferred embodiment of FIG. 1, the residual errors in each exterior block are not always encoded.

Figure 1A:
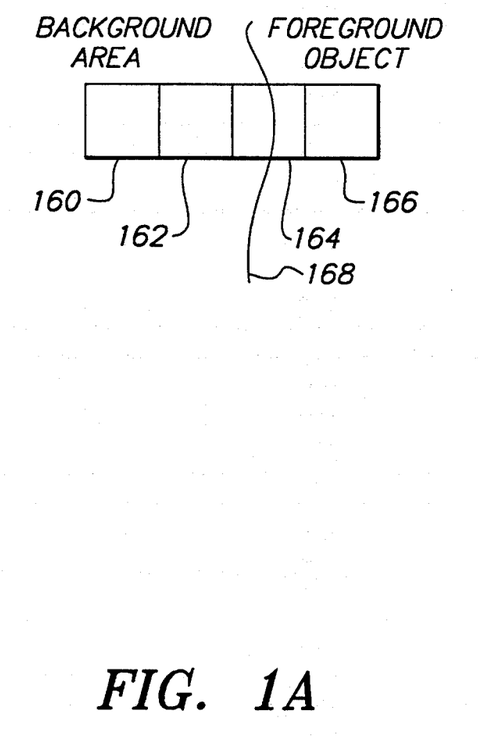
FIG. 1A shows a portion of an exemplary image containing a moving edge.

The basis for ignoring residual errors in all blocks except those containing a moving edge is explained with reference to FIG. 1A, which shows a portion of an exemplary image containing moving edge 168. By way of example, blocks 160, 162, 164, 166 may be thought of as representing four blocks from residual error image 110. Moving edge 168 represents the edge of a moving foreground object. Thus, block 164 straddles two areas; a moving foreground object area on one side of edge 168 and a background area on the other side of edge 168. Since block 164 cannot have a displacement vector that accurately reflects the movement of both areas between frames, block 164 will likely include large residual errors (unless the background area happens to be perfectly flat). For purposes of this example, it is assumed that blocks 160, 162, 166 (which do not contain a moving edge) have displacement vectors that accurately reflect those blocks and that the residual errors associated with these blocks are therefore small. Since block 164 is likely to have a displacement vector that reflects the motion of moving edge 168, the displacement vector associated with block 164 will likely differ from that of at least one of its neighbors (blocks 162, 166). If the displacement vectors associated with blocks 162 and 164 differ, then both these blocks will be exterior blocks. In addition, as a result of their differing displacement vectors, a discontinuity will likely be generated at the boundary of blocks 162, 164. If the residual errors associated with this discontinuity are not encoded, a serious artifact will result. However, this discontinuity between blocks 162 and 164 is caused entirely by the presence of moving edge 168 in block 164. Therefore, so long as the residual errors associated with block 164 are encoded, the residual errors associated with block 162 can be ignored.

Figure 1B:
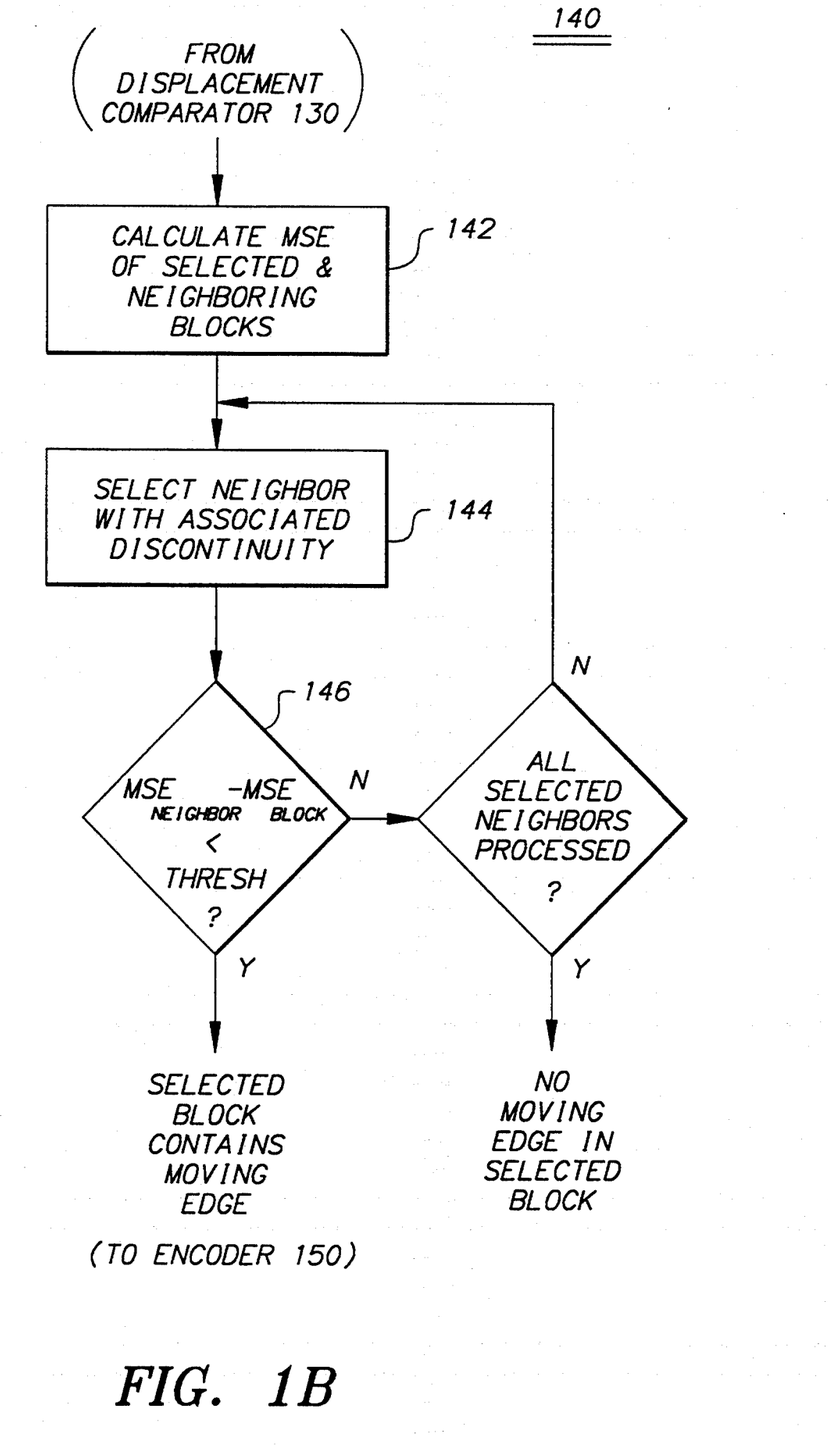
FIG. 1B shows a flow diagram of a moving edge detection system according to a preferred embodiment of the present invention.

Referring now to FIG. 1B, there is shown a flow diagram of moving edge finder 140 according to a preferred embodiment of the present invention. Error calculator 142 is provided for calculating the mean-square-error associated with the block selected by block selector 120 as well as the mean-square-error associated with each neighboring block that has an associated discontinuity at the boundary between itself and the block selected by block selector 120. Neighboring block selector 144 selects for processing a block which both neighbors the block selected by block selector 120 and which also has an associated discontinuity between itself and the block selected by block selector 120. Error comparator 146 determines the difference between the mean-square-error associated with the selected neighboring block and the mean-square-error associated with the block selected by block selector 120, and then compares this difference with a threshold. If the difference between these two values is less than a predetermined threshold, then a determination is made that the block selected by selector 120 contains a moving edge. If the calculated threshold has not fallen below the threshold after all the selected neighboring blocks with associated discontinuities have been processed by comparator 146, then a determination is made that the block selected by selector 120 does not contain a moving edge.

An alternative embodiment of moving edge finder 140 (not shown) could employ a heuristic to determine whether a given block contains a moving edge. The heuristic (which is employed in the teleconferencing field) assumes that a moving edge is always associated with a foreground object. Using such a heuristic, moving edge finder 140 could function by simply determining whether the selected block under consideration is associated with such a foreground object.

Figure 3:
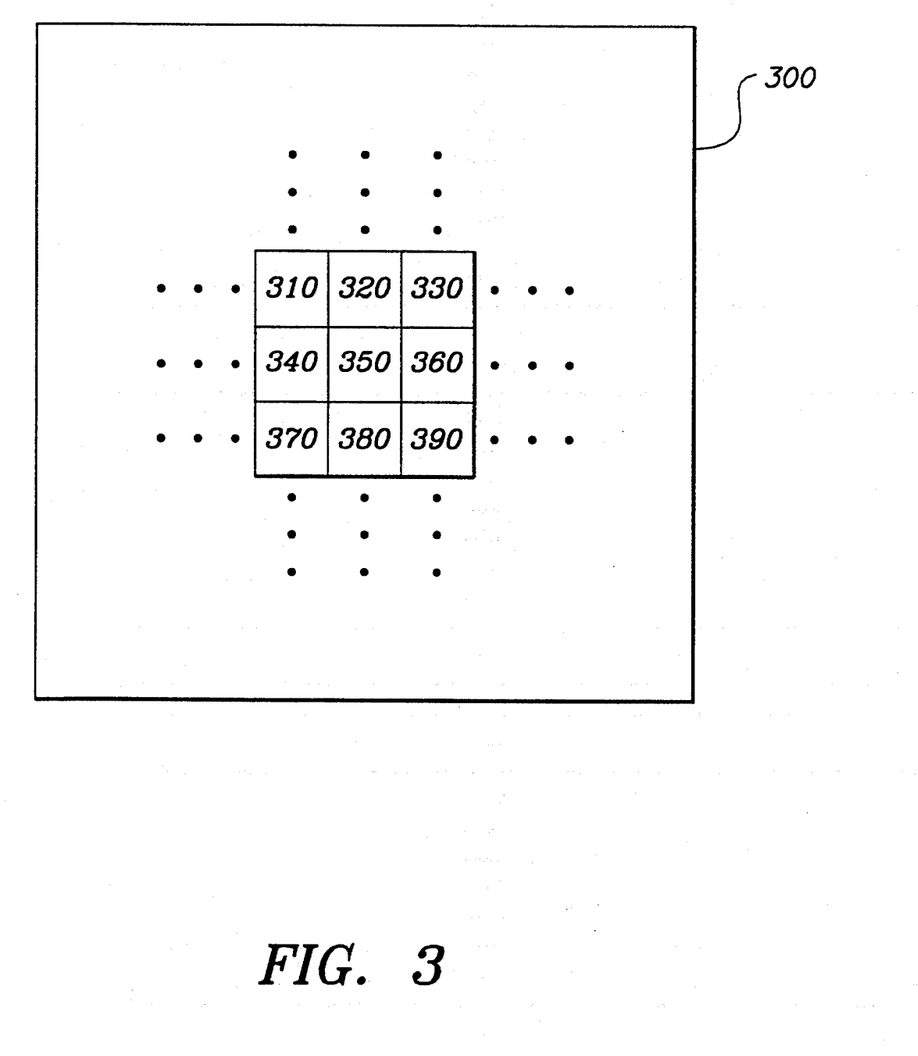
FIG. 3 shows an exemplary residual error image tiled into a plurality of blocks.

Referring now to FIG. 3, there is shown residual error image 300 tiled into a plurality of blocks. In the embodiment shown in FIG. 1, displacement comparator 130 compares the displacement vector associated with a selected block (e.g., block 350) with each of the displacement vectors associated with the neighboring blocks of the selected block. Displacement comparator 130 will deem the selected block to be an exterior block if the displacement vector associated with the selected block varies from that of at least one of its neighbors. In the preferred embodiment, two blocks are defined to be neighbors if they share at least one common boundary. According to this preferred definition, block 350 has four neighbors which are blocks 320, 340, 360, 380. In an alternate embodiment, two blocks are defined to be neighbors if they share either a common boundary or a common corner. According to this alternate definition, block 350 has eight neighbors which are blocks 310, 320, 330, 340, 360, 370, 380, 390.

Figure 2:
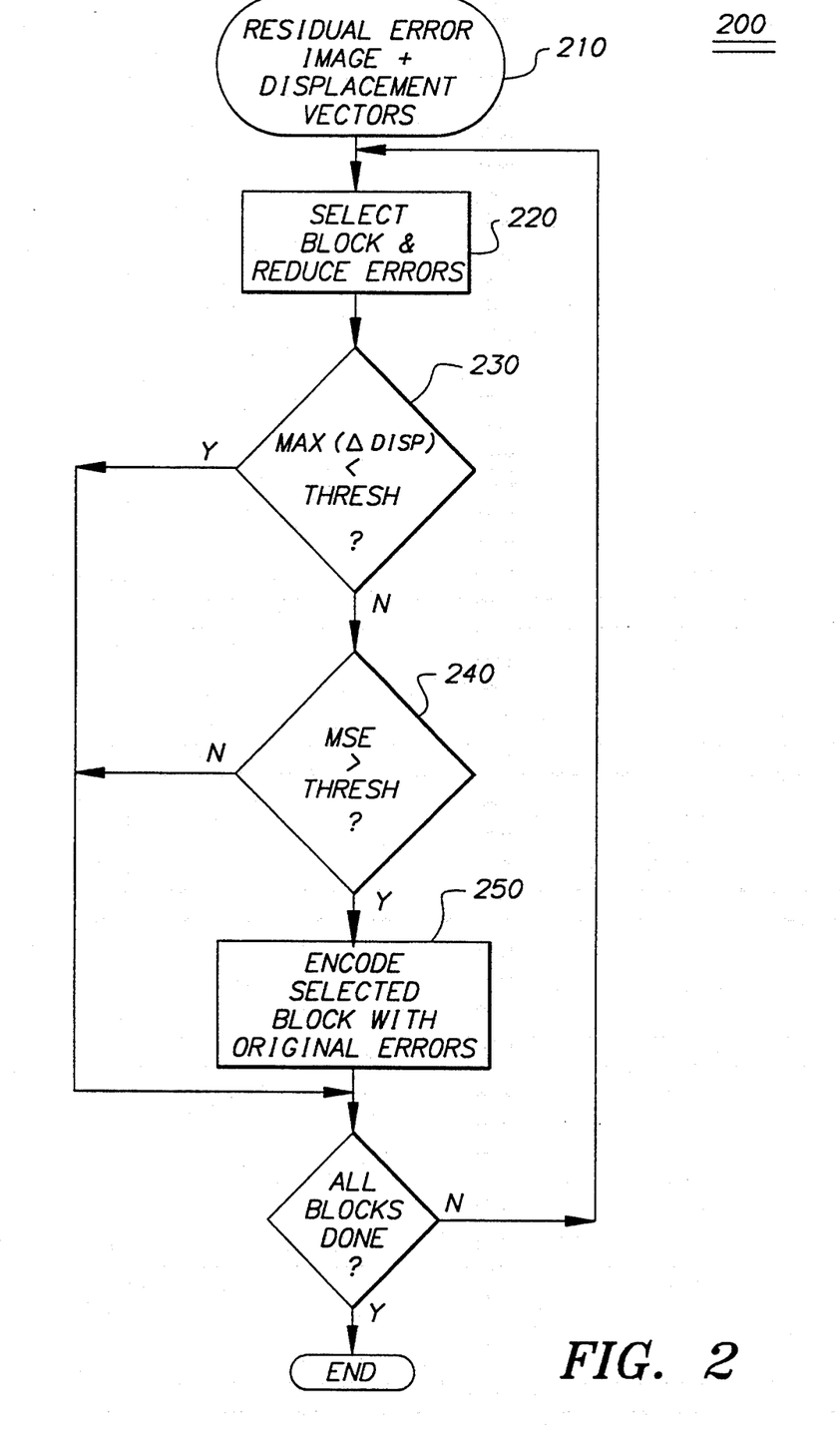
FIG. 2 shows a flow diagram illustrating the operation of a further preferred embodiment according to the present invention.

Referring now to FIG. 2, there is shown a flow diagram illustrating the operation of partial image encoder 200 according to a further preferred embodiment of the present invention. Partial image encoder 200 accepts as its input residual error image 210 and the displacement vectors associated therewith. In contrast to partial image encoder 100, an exterior block is defined in partial image encoder 200 as a block having a displacement that differs from that of one its neighbors by some threshold. Also in contrast to the operation of partial image encoder 100, only exterior blocks having a mean-square-error that exceeds a threshold are encoded by partial image encoder 200. In the preferred embodiment of encoder 200, two blocks are defined to be neighbors if they share a common boundary. In an alternate embodiment of encoder 200, two blocks will be defined as neighbors if they share either a common boundary or a common corner.

Error reducer 220 is provided for selecting a block from residual error image 210 and for reducing the errors in the selected block by a measure of activity. In a preferred embodiment, error reducer 220 measures the mean-square-error of the pixels in the selected block and calculates the variance of the pixel values in the selected block. The mean-square-error is then reduced by an amount equal to k times the variance, where k is a constant on the order of 0.4.

Displacement comparator 230 is provided for determining whether the selected block is an "interior" block or an "exterior" block. Displacement comparator 230 compares the displacement vector associated with the selected block with each of the displacement vectors associated with the neighboring blocks of the selected block. For purposes of the embodiment shown FIG. 2, if the difference between the displacement vector of the selected block differs from that of each of its neighbors by less than a specified threshold, the selected block is defined to be an interior block; otherwise, the selected block is defined as an exterior block. This definition for an exterior block is thus the same as that set forth in FIG. 1 above, with the threshold set at zero.

In determining whether the displacement vectors associated with two blocks differ by more than a threshold, it should be recognized that each displacement vector (V) is typically represented by two values ($V_1$, $V_2$) that reflect the motion of a block along two associated axes. Accordingly, displacement comparator 230, which compares a pair of displacement vectors (V, W) to each other, preferably functions by determining the quantity square-root($(V_1-W_1)^2+(V_2-W_2)^2$) for each pair of displacement vectors and then comparing this quantity for each pair of displacement vectors under consideration to see if a threshold has been exceeded. In an alternative embodiment, displacement comparator 230 functions by determining the quantity (ABS($V_1-W_1$)+ABS($V_2-W_2$)) for each pair of displacement vectors and then comparing this quantity for each pair of displacement vectors under consideration to see if a threshold has been exceeded.

If displacement comparator 230 determines that the selected block is an exterior block, then error threshold detector 240 processes the selected block to determine whether its reduced mean-square-error (as calculated by means 220) exceeds a specified threshold. Encoder 250 is provided for encoding the residual errors of only those exterior blocks that have a reduced mean-square-error that exceeds the specified threshold.

In the preferred embodiment of the present invention, the reduced mean-square-error value used by error threshold detector 240 reflects the reduced errors associated with each and every pixel in the exterior block under consideration. In an alternative embodiment of the present invention illustrated by FIGS. 2A and 2B, error threshold detector 240 is replaced by error comparator 240a. In contrast to error threshold detector 240 which considers the mean-square-error (as calculated by means 220) associated with every pixel in the exterior block under consideration in determining whether to encode the errors associated with that block, error comparator considers only the mean-square-error (as calculated by means 220) associated with those pixels that lie on or near (within several pixels of) a specified boundary of the exterior block under consideration.

Figure 2A:
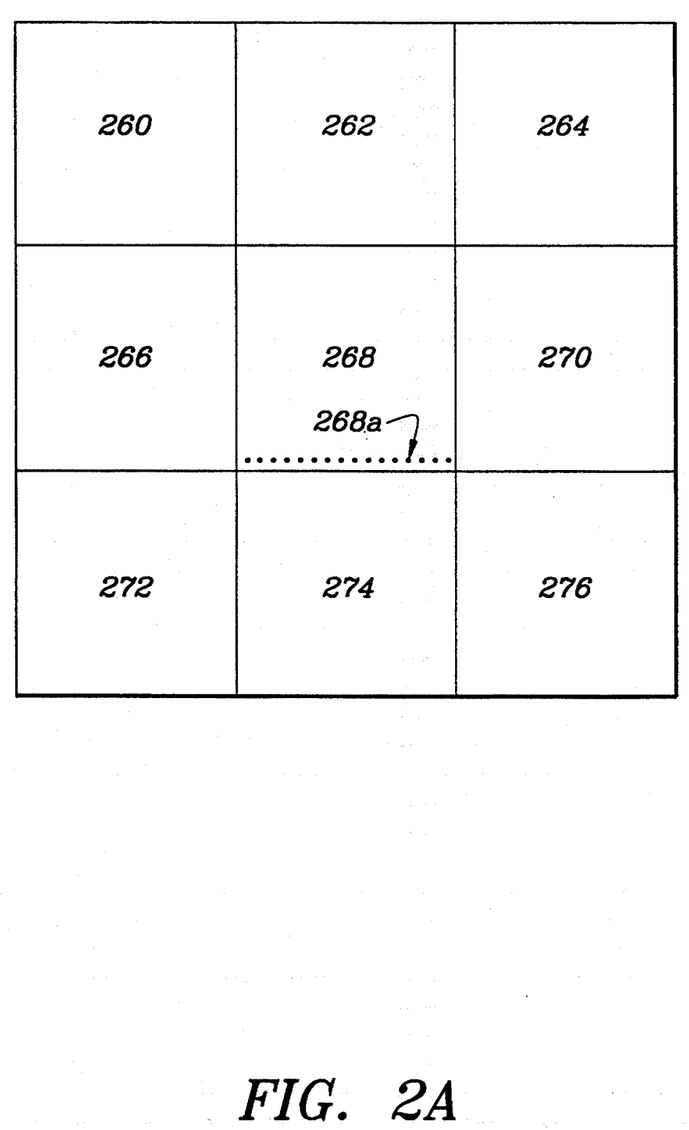
FIG. 2A is an exemplary image illustrating a system for calculating the mean-square-error associated with a discontinuity according to a preferred embodiment of the present invention.

Referring now to FIG. 2A, there is shown an exemplary image for illustrating the operation of error comparator 240a in accordance with an alternative preferred embodiment of the present invention. In the example of FIG. 2A, it is assumed that block 268 has been determined to be an exterior block. It is further assumed that a discontinuity has been determined to exist at the boundary between blocks 268 and 274, but that no such discontinuity exists at the boundaries between block 268 and blocks 262, 266, 270. A discontinuity such as the one assumed to be present between blocks 268 and 274 could be detected where, for example, the displacement vectors associated with blocks 268 and 274 differ by more than a threshold, but the displacement vectors associated with blocks 262, 266, 268, 270 do not so differ. In accordance with the alternative embodiment illustrated by FIG. 2A, errors (as calculated by means 220) associated with pixels lying along the edge of a block (block 268) where a discontinuity has been determined to exist are evaluated (summed) and compared against a threshold in order to determine whether to encode the errors associated with the block. Thus, in the example of FIG. 2A, pixels 268a are evaluated by summing the errors associated with pixels 268a and comparing the determined sum to a threshold. If the sum (E) of the errors associated with pixels 268a exceeds the threshold, then a determination is made to encode the errors associated with block 268; otherwise, the errors associated with block 268 are not encoded and are ignored.

Figure 2B:
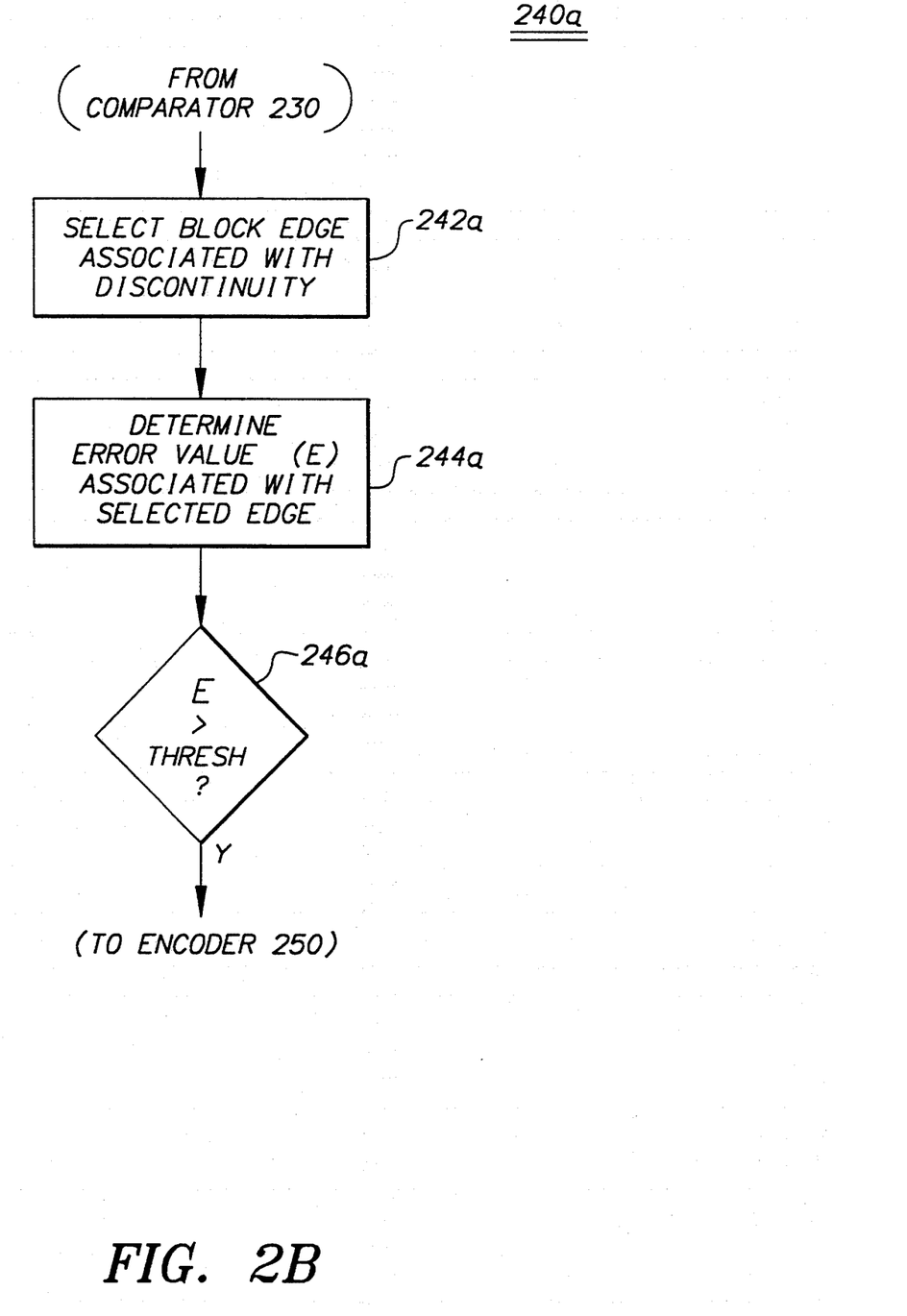
FIG. 2B shows a flow diagram of an error comparator according to a preferred embodiment of the present invention.

FIG. 2B shows a flow diagram illustrating the operation of error comparator 240a. Block edge selector 242a is provided for selecting from the exterior block under consideration an edge that is associated with a discontinuity. This edge is preferably found or detected by comparing the displacement vector of the block under consideration (i.e., the block selected by selector 220) with the displacement vectors associated with each of the neighboring blocks thereto. In the preferred embodiment, a discontinuity will be determined to exist along a boundary between the block under consideration and a neighboring block only if their associated displacement vectors differ by more than a threshold. Error determinator 244a is provided for summing the errors associated with pixels lying along the selected edge. The sum determined by error determinator 244a is designated as E on FIG. 2B. Comparator 246a compares E with a threshold to determine whether the threshold has been exceeded. If so, the errors associated with the block under consideration are encoded; otherwise the errors associated with the block under consideration are ignored.

Figure 2C:
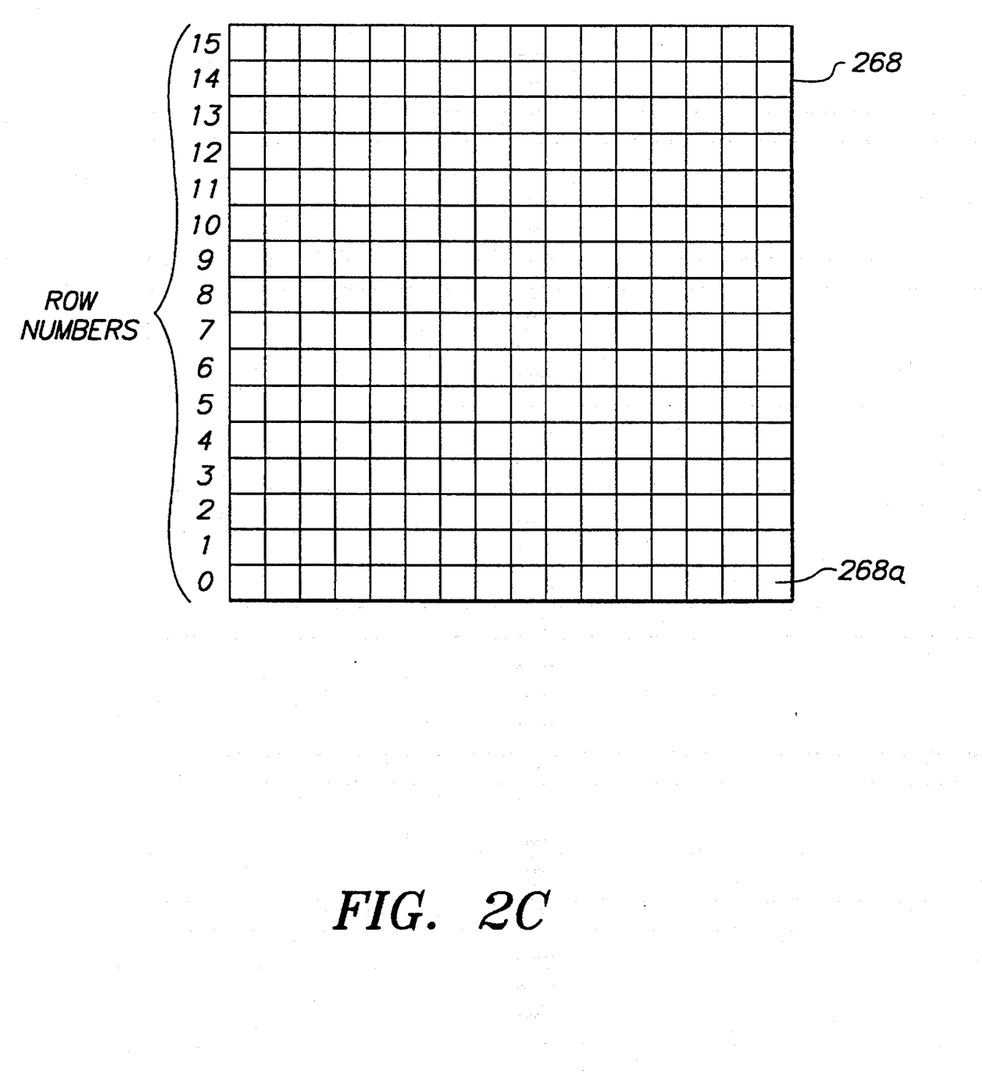
FIG. 2C is an exemplary image illustrating a system for unevenly reducing the errors associated with a selected block of pixels according to a preferred embodiment of the present invention.

In accordance with a further aspect of the present invention, where a determination has been made by error comparator 240a to encode the errors associated with the block under consideration, the errors in the block under consideration are unevenly reduced by partial image encoder 250a prior to being encoded. Referring now to FIG. 2C, there is shown an exemplary image illustrating a system for unevenly reducing the errors associated with pixel block 268 (of FIG. 2A). In the example of FIG. 2C, it is assumed that a discontinuity has been determined to exist along the boundary of block 268 associated with pixel row 268a, but that there are no discontinuities associated with the others sides of block 268. Block 268 is 16×16 pixels in dimension and the rows of block 268 are numbered from 0 to 15, wherein row 0 corresponds to the row of pixels closest to the determined discontinuity (i,e., pixels 268a) and row 15 corresponds to the row of pixels that is furthest from the determined discontinuity. In accordance with the present invention, each row of pixels in block 268 starting with row 1 is multiplied by a reduction factor that acts to increasingly reduce each row of pixels as the distance between the row being processed and the discontinuity increases. In the preferred embodiment, the reduction factor reduces the pixels by 100% by the time row 8 is reached and, as a result, the errors associated with rows 8 to 15 are zeroed prior to being encoded. Although in the preferred embodiment the reduction factor changes linearly as the distance between the row being processed and the discontinuity increases, in alternate embodiments the reduction factor can be made to vary in accordance with non-linear functions such as exponentials and polynomials as the distance between the row being processed and the discontinuity changes.

Figure 2D:
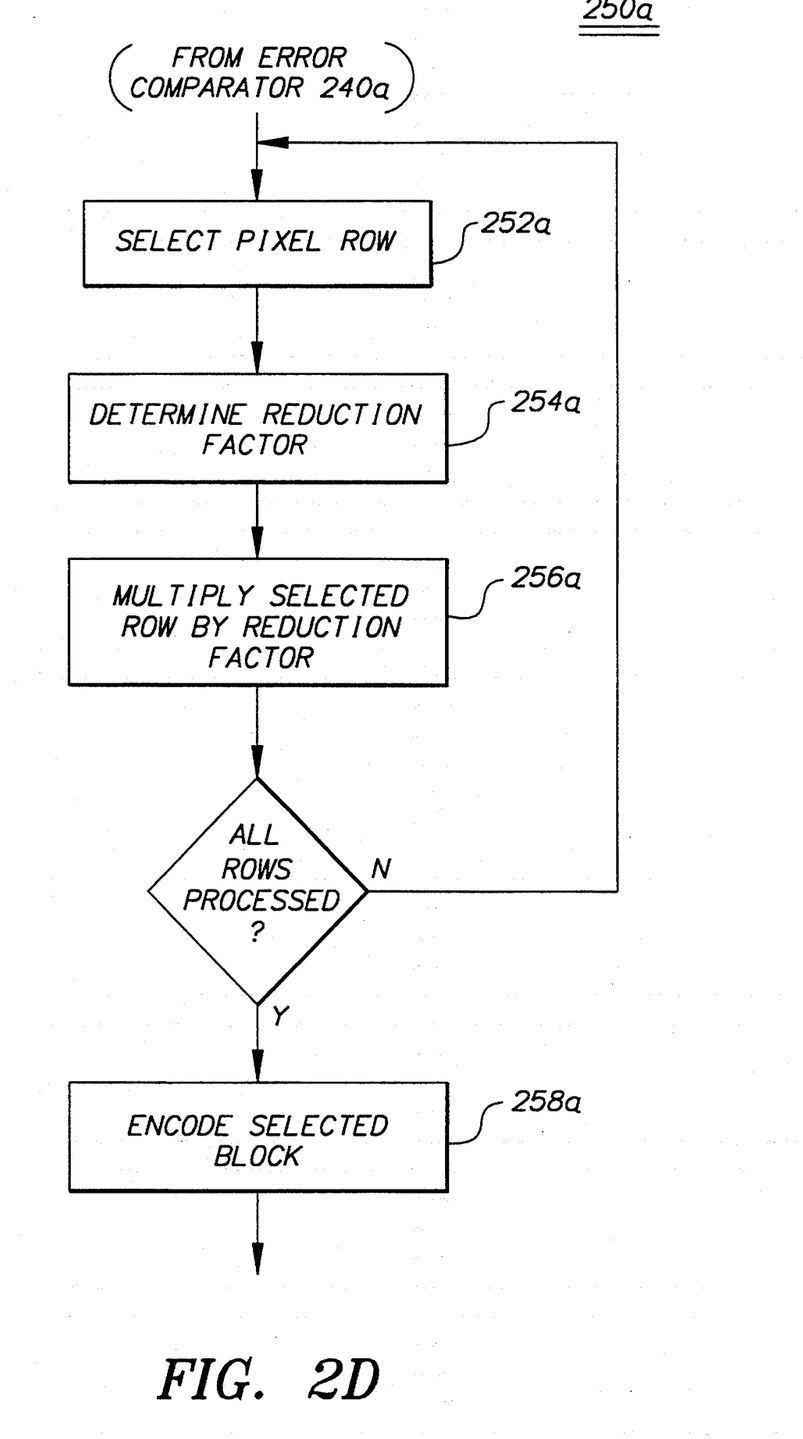
FIG. 2D shows a flow diagram of a partial image encoder according to a further preferred embodiment of the present invention.

Referring now to FIG. 2D, there is shown a flow diagram of partial image encoder 250a according to the present invention. Row selector 252a is provided for selecting a row from the block under consideration for processing. Row selector 252a preferably first selects the row closest to the determined discontinuity (e.g., row 0 in the example of FIG. 2C) and thereafter sequentially selects rows that are increasingly farther away from the first selected row. Reduction factor determinator 254a is provided for determining a reduction factor to be applied to the selected row of pixels. In the preferred embodiment, the reduction factor is determined in accordance with equation (1) below:

$$\text{Reduction Factor} = \text{MAX} (((8 - \text{Row Number})/8), 0) \quad (1)$$

Multiplier 256a is provided for multiplying the pixels in the selected row by the reduction factor determined therefor. Since the reduction factor will be zero for rows 8 to 15, the errors associated with these rows will be zeroed by multiplier 256a. After all the rows in the block have been processed by multiplier 256a, the pixels in the block under consideration (as modified by multiplier 256a) are encoded by encoder 258a.

A partial image encoder according to the present invention may be implemented using an Intel model i860 parallel processor or a general purpose processor.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for partially encoding an image, comprising the steps of:
    (a) dividing said image into a plurality of blocks;
    (b) selecting one block from said plurality of blocks and thereby forming a selected block;
    (c) determining whether said selected block is an exterior block; wherein a displacement vector is associated with each block of said plurality of blocks and step (c) comprises the steps of:
        (i) for each block that is a neighbor of said selected block, determining the difference between the displacement vector associated with said selected block and the displacement vector associated with said neighbor;
        (ii) selecting the maximum difference determined in step (i);
        (iii) comparing said maximum difference to a first threshold; and
        (iv) if said maximum difference exceeds said threshold, then determining said selected block to be an exterior block;
    (d) encoding said selected block only if said selected block is determined to be an exterior block, otherwise ignoring said selected block; and
    (e) repeating steps (b)-(d) for each block of said plurality of blocks.

2. The method of claim 1, wherein said first threshold is zero.

3. The method of claim 1, wherein said selected block is encoded in step (d) only if said selected block contains a moving edge.

4. The method of claim 1, wherein said selected block is encoded in step (d) only if the mean-square-error associated with said selected block exceeds a second threshold.

5. An apparatus for partially encoding an image, comprising:
    (a) means for dividing said image into a plurality of blocks;
    (b) a block selector for selecting one block from said plurality of blocks and thereby forming a selected block;
    (c) a displacement comparator for determining whether said selected block is an exterior block; wherein a displacement vector is associated with each block of said plurality of blocks and said displacement comparator comprises:
        (i) determining means for determining the difference between the displacement vector associated with said selected block and the displacement vector associated with each block that is a neighbor of said selected block;
        (ii) means for selecting the maximum difference determined by said determining means;
        (iii) means for comparing said maximum difference to a first threshold; and
        (iv) means for determining said selected block to be an exterior block if said maximum difference exceeds said first threshold; and
    (d) an encoder for encoding said selected block only if said selected block is determined to be an exterior block and otherwise ignoring said selected block.

6. The apparatus of claim 5, wherein said first threshold is zero.

7. The apparatus of claim 5, wherein said selected block is encoded by said encoder only if said selected block contains a moving edge.

8. The apparatus of claim 5, wherein said encoder encodes said selected block only if the mean-square-error associated with said selected block exceeds a second threshold.

9. A method for partially encoding an image, comprising the steps of:
    (a) dividing said image into a plurality of blocks;
    (b) selecting one block from said plurality of blocks and thereby forming a selected block;

(c) determining whether said selected block is an exterior block, comprising the steps of:
(1) determining the mean-square-error associated with said selected block and reducing said mean-square-error by an activity measure; and
(2) determining whether said reduced mean-square-error exceeds a second threshold;
(d) encoding said selected block only if said selected block is determined to be an exterior block, otherwise ignoring said selected block; and
(e) repeating steps (b)–(d) for each block of said plurality of blocks;
wherein said selected block is encoded in step (d) only if said reduced mean-square-error exceeds said second threshold.

10. The method of claim 9, wherein said selected block is encoded in step (d) only if said selected block contains a moving edge.

11. The method of claim 9, wherein said activity measure is the variance of the pixels in said selected block.

12. A method for partially encoding an image, comprising the steps of:
(a) dividing said image into a plurality of blocks;
(b) selecting one block from said plurality of blocks and thereby forming a selected block;
(c) determining whether said selected block is an exterior block, comprising the steps of:
(1) determining a mean-square-error value corresponding to pixels lying along one edge of said selected block; and
(2) comparing said mean-square-error value to a threshold;
(d) encoding said selected block only if said selected block is determined to be an exterior block, otherwise ignoring said selected block; and
(e) repeating steps (b)–(d) for each block of said plurality of blocks;
wherein said selected block is encoded in step (d) only if said mean-square-error value exceeds said threshold.

13. The method of claim 12, wherein said selected block is encoded in step (d) only if said selected block contains a moving edge.

14. The method of claim 12, wherein said selected block is encoded in step (d) only if the mean-square-error associated with said selected block exceeds a second threshold.

15. An apparatus for partially encoding an image, comprising:
(a) means for dividing said image into a plurality of blocks;
(b) a block selector for selecting one block from said plurality of blocks and thereby forming a selected block;
(c) a displacement comparator for determining whether said selected block is an exterior block;
(d) an encoder for encoding said selected block only if said selected block is determined to be an exterior block and otherwise ignoring said selected block;
(e) an error reducer for calculating the mean-square-error associated with said selected block and reducing said mean-square-error by an activity measure; and
(f) an error threshold detector for determining whether said reduced mean-square-error exceeds a second threshold;
wherein said selected block is encoded by said encoder only if said reduced mean-square-error exceeds said second threshold.

16. The apparatus of claim 15, wherein said selected block is encoded by said encoder only if said selected block contains a moving edge.

17. The apparatus of claim 15, wherein said activity measure is the variance of the pixels in said selected block.

18. An apparatus for partially encoding an image, comprising:
(a) means for dividing said image into a plurality of blocks;
(b) a block selector for selecting one block from said plurality of blocks and thereby forming a selected block;
(c) a displacement comparator for determining whether said selected block is an exterior block, said displacement comparator comprising:
(1) an error determinator for determining a mean-square-error value corresponding to pixels lying along one side of said selected block; and
(2) a comparator for comparing said mean-square-error value to a threshold; and
(d) an encoder for encoding said selected block only if said selected block is determined to be an exterior block and otherwise ignoring said selected block;
wherein said selected block is encoded by said encoder only if said mean-square-error value exceeds said threshold.

19. The apparatus of claim 18, wherein said selected block is encoded by said encoder only if said selected block contains a moving edge.

20. The apparatus of claim 18, wherein said encoder encodes said selected block only if the mean-square-error associated with said selected block exceeds a second threshold.

* * * * *

UNITED STATES PATENT AND TRADEMARK OFFICE
CERTIFICATE OF CORRECTION

PATENT NO. : 5,440,350
DATED : August 8, 1995
INVENTOR(S) : Stuart J. Golin

It is certified that error appears in the above-indentified patent and that said Letters Patent is hereby corrected as shown below:

Column 5, line 47, delete "$_{w2}$" and insert therefor --$W_2$--.

Signed and Sealed this

Fourteenth Day of May, 1996

Attest:

BRUCE LEHMAN

Attesting Officer  Commissioner of Patents and Trademarks